Figure 1:
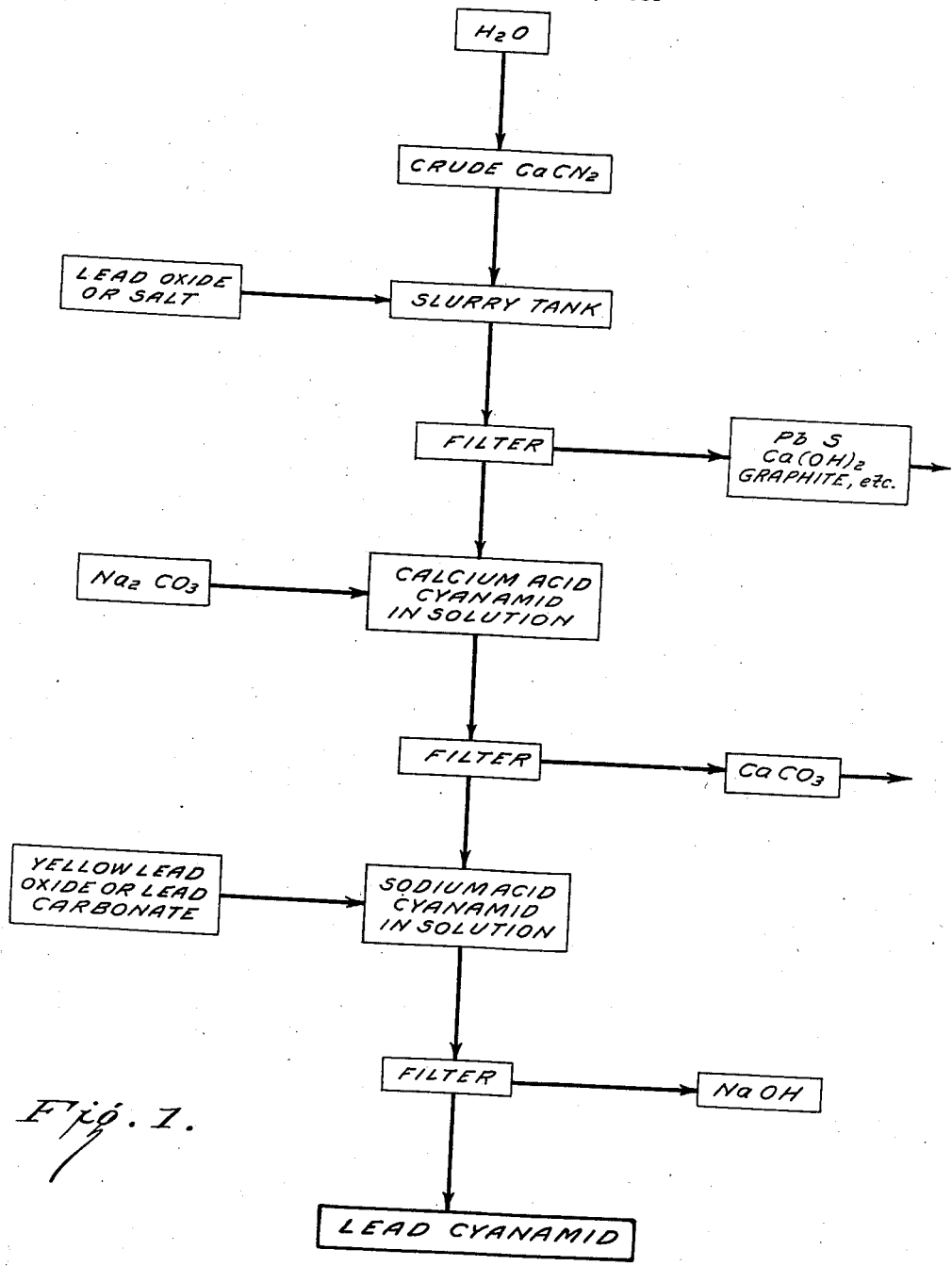

Sept. 3, 1940.  K. D. ASHLEY ET AL  2,213,441
METHOD OF PREPARING LEAD CYANAMIDE Original Filed Feb. 2, 1939  3 Sheets-Sheet 1

INVENTORS,
KENNETH D. ASHLEY,
CYRIL B. CLARK,
BY Ellis S. Middleton
ATTORNEY.

Patented Sept. 3, 1940

2,213,441

UNITED STATES PATENT OFFICE 2,213,441

METHOD OF PREPARING LEAD CYANAMIDE

Kenneth D. Ashley, Darien, Conn., and Cyril B. Clark, Scarsdale, N. Y., assignors to American Cyanamid Company, New York, N. Y., a corporation of Maine Original application February 2, 1939, Serial No. 254,200. Divided and this application April 18, 1940, Serial No. 330,234

2 Claims. (Cl. 23—78)

The present invention relates to methods of manufacturing lead cyanamide.

The value of lead cyanamide as a pigment is well known in that it has a covering power equal or superior to primrose yellow, which is an accepted standard in this trade. However, the chrome yellows have a tendency, under the influence of sunlight, to fade and lose their color, whereas a good grade of lead cyanamide has been proven to be much superior in light fastness to that of any other similar material tested.

It is well known that chrome yellows are not particularly alkali resistant, whereas it has been found that pigments containing lead cyanamide are much more stable under these conditions.

Another valuable property inherent in lead cyanamide is its usefulness as an ingredient of under-water paint in that it has a tendency to prevent the adherence of marine growths on surfaces painted therewith. In such cases, the particular color or purity of shade is not of importance and, consequently, poorer grades may be used for this purpose without detracting from its usefulness.

The literature proposes the manufacture of lead cyanamide from commercial calcium cyanamide by treating a sulfur-free water extract thereof with a solution of a lead salt. When, however, such procedures were followed, it has been found that mechanical manipulation of the thus produced lead cyanamide is difficult, due, perhaps, to the physical form in which the compound is thrown out of solution and, moreover, the final product is inferior in quality.

The principal object of the present invention, therefore, is the production of lead cyanamide which may be made without manufacturing difficulties and from reasonably cheap sources of material.

Where such substances are to be used as pigments and it is desired to take advantage of its brightness of shade, covering power and/or light fastness, it may be prepared according to the present methods as high as 96% pure, which is of distinct value.

To this end, the invention contemplates in one of its broadest aspects, the manufacture of lead cyanamide by treatment of a water slurry of crude calcium cyanamide to remove sulfur and other objectionable compounds, followed by precipitation of lead cyanamide from a solution of a cyanamide by means of yellow lead oxide preferably relatively pure, such as is obtained by subliming litharge, or by means of lead carbonate or the basic carbonate. It has been found that under these circumstances, the lead cyanamide is thrown down in a physical form which not only facilitates the filtering and washing thereof but the desirable characteristics of the final product are thereby enhanced.

Inasmuch as calcium compounds in the final product tend to decrease the covering power of the yellow pigment, it is desirable, where this is important, that such compounds should be eliminated at some stage of the manufacturing process.

The invention contemplates alternate methods for the removal of calcium from the system. The preferred procedure is to throw out the calcium by adding soda ash prior to precipitation of the lead cyanamide. A modified procedure contemplates the precipitation of calcium as a sulfate by adding sulfuric acid to the water extract of the crude cyanamide starting material followed by the formation of lead cyanamide. In a third modification, the calcium may be removed from the system after the formation of lead cyanamide by adding to a slurry of the crude material acidic substances, while maintaining the slurry alkaline in reaction. This has the effect of converting the calcium compounds to soluble or relatively soluble salts which may be removed in a filtering or washing operation.

The invention further contemplates the novel steps and combination of steps hereinafter more particularly described.

The drawings show a series of flow sheets illustrating alternative methods of carrying out the processes of the invention.

Referring now to Fig. 1, which is the preferred method of carrying out the invention, we desire to use as a starting material a fully hydrated crude calcium cyanamide. This cheap, convenient, commercial product contains approximately 20% cyanamide nitrogen together with impurities such as calcium hydroxide, graphite, combined sulfur and other solid impurities. Inasmuch as any sulfur present during the formation of the lead cyanamide is converted to lead sulfide, it is desirable to remove such sulfur prior to that step in order to maintain the bright color of the lead cyanamide, where it is to be used as a pigment. This sulfur may be readily removed by slurrying the crude calcium cyanamide in water and adding thereto requisite quantities of a lead compound such as lead carbonate, basic lead carbonate or lead oxide. Under these circumstances, no undesirable reaction products are introduced. Upon passing this magma to a separation equipment, such as a filter, the solids, generally consisting of the lead sulfide, calcium hydroxide, graphite, silica and other solid impurities are removed. The filtrate from this operation consists of a solution of acid calcium cyanamide. Where color is of no importance, however, this step may be omitted, although it will be desirable to filter the slurry to get rid of the other solid impurities.

In order to remove calcium from the system, a sufficient quantity of soda ash may now be added to precipitate the calcium as carbonate which at the same time converts the cyanamide to acid sodium cyanamide.

The solution of sodium acid cyanamide may now be readily converted to lead cyanamide by adding thereto yellow lead oxide, lead carbonate or basic lead carbonate. A reasonably pure grade of yellow lead oxide is preferred inasmuch as this gives a final product of good color without contaminating impurities. Where color is not of particular importance, such for instance as where the lead cyanamide is to be used in an under-water paint, ordinary litharge may be used. However, due to the fact that ordinary litharge contains some quantities of red oxide of lead and this substance appears to be unreactive with the acid sodium cyanamide, it appears in the final product as such, with consequent dulling of the color. As above stated, however, this may not be of any moment in some circumstances.

Due to the fact that the acid sodium cyanamide solution is distinctly alkaline, the reaction with yellow lead oxide or carbonate proceeds with amazing smoothness and the lead cyanamide resulting therefrom is in such physical form as to make its separation from the solution in which it is formed comparatively simple. This is not true if lead nitrate or other soluble lead salts are used at this point. The resulting lead cyanamide may be readily washed and dried to a substantially pure product.

Figure 2:
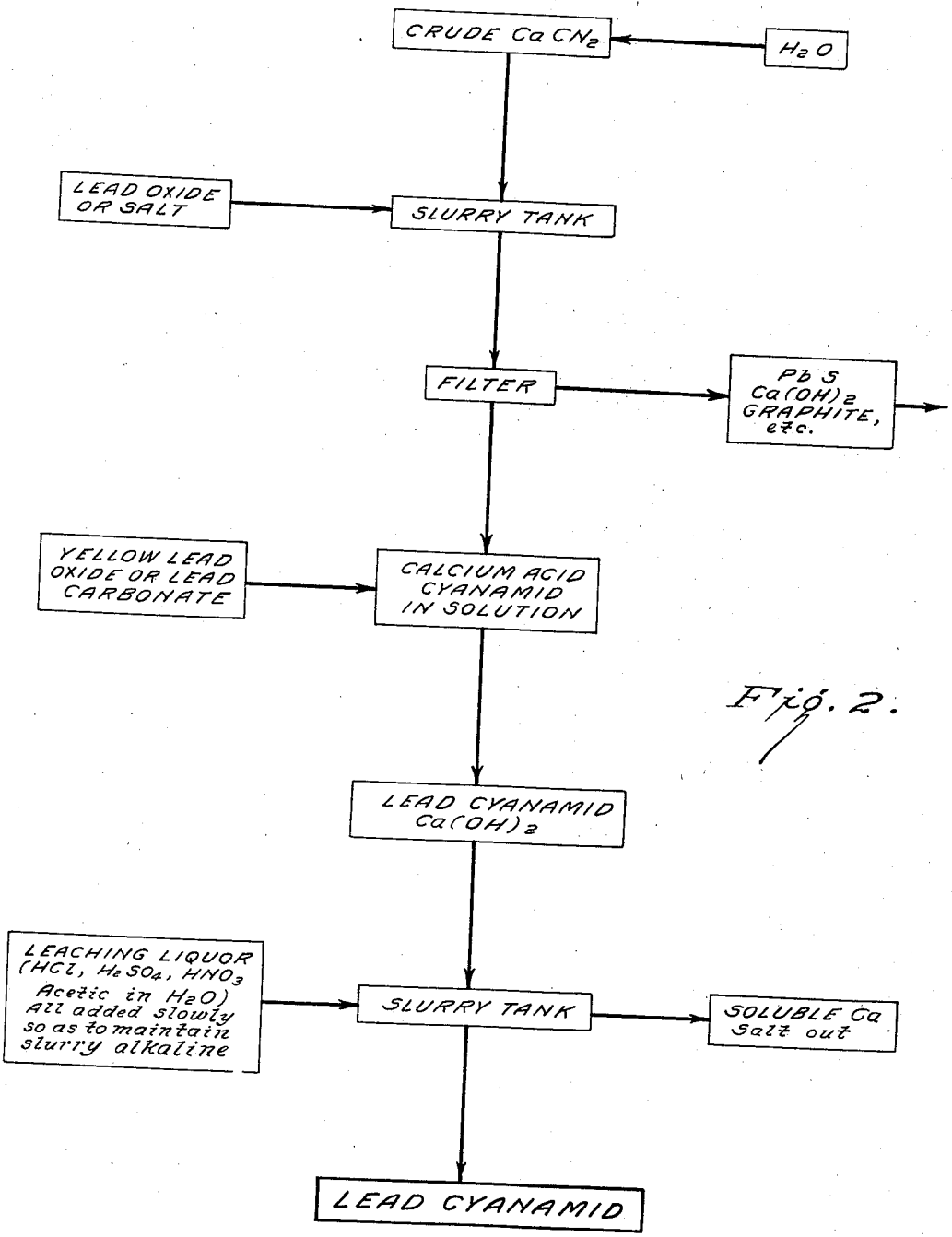

In Fig. 2, an alternative procedure is shown which is substantially identical in all respects to that above described down to the formation of the solution of acid calcium cyanamide. According to the modified procedure, yellow lead oxide, preferably such as is obtained by subliming litharge, may be added at this point with the formation of lead cyanamide as before. However, this magma also contains all of the calcium which must now be removed if a product of good covering power is desired. These calcium compounds may be substantially eliminated by leaching the solid product of the lead oxide or carbonate reaction step with an acidic material such as hydrochloric, nitric, acetic or sulfuric acids as rather dilute solutions and added slowly so as to maintain the reaction of the slurry alkaline. In this operation, the calcium is converted to a soluble salt which may be readily washed from the lead cyanamide, leaving that product in a relative state of purity.

Figure 3:
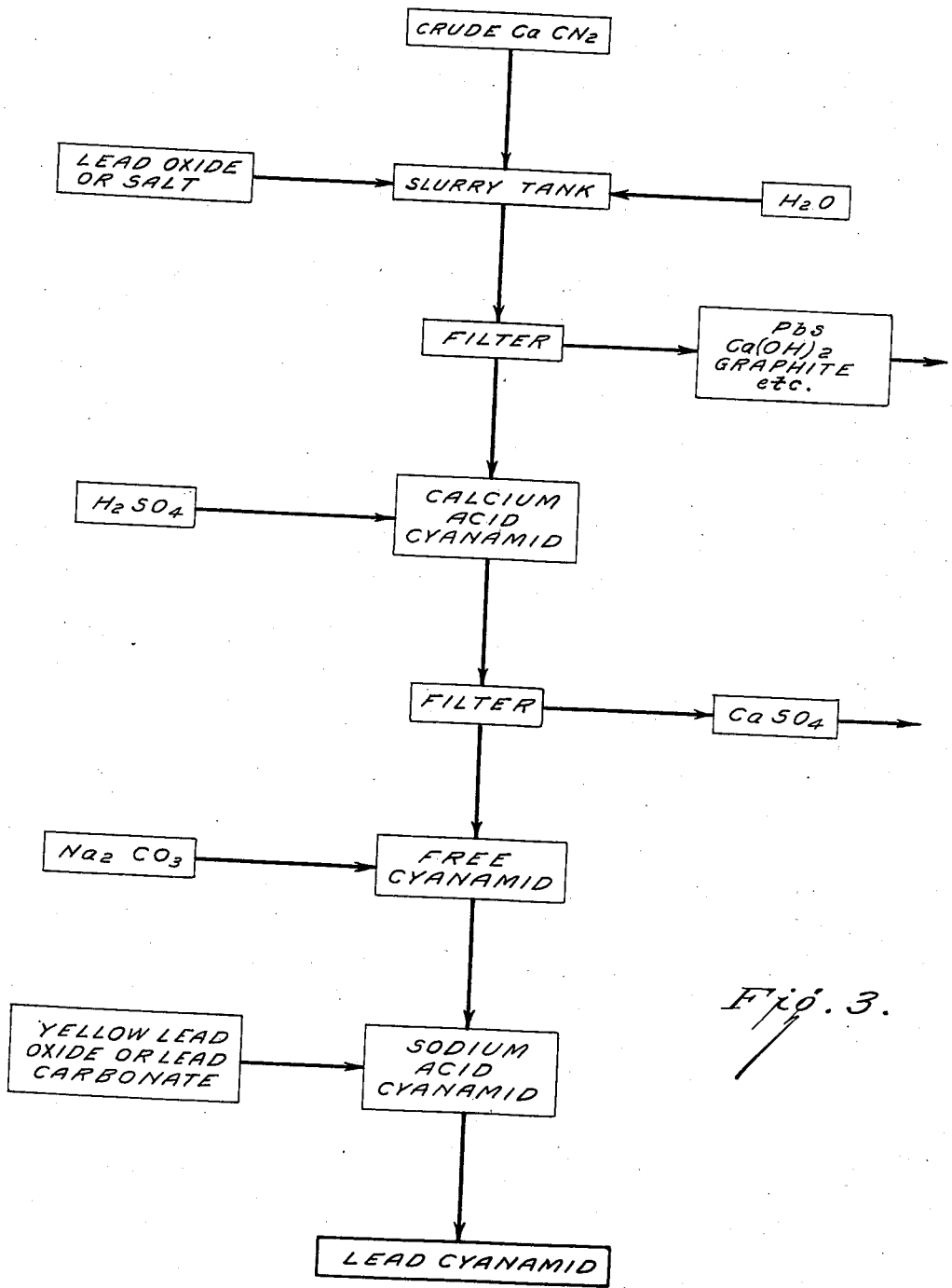

In the modification shown in Fig. 3, the procedure above described in connection with Figs. 1 and 2 is followed down to the formation of acid calcium cyanamide. If now requisite quantities of sulfuric acid are added thereto, the calcium content will be thrown down as the sulfate which may be removed by filtration, leaving free cyanamide in the filtrate. Soda ash or caustic soda may now be added to the filtrate until all of the free cyanamide therein has been converted to acid sodium cyanamide or nearly so. The addition of yellow lead oxide to this solution under the conditions as above described for the second modification results in the formation of lead cyanamide which may be recovered as before.

Under some circumstances, it may be desirable to replace the sulfuric acid and soda ash or caustic addition steps by adding sodium sulfate direct to the acid calcium cyanamide solution, whereby there will be formed at one and the same time calcium sulfate which may be removed as a precipitate and acid sodium cyanamide.

Example I 100 parts of completely hydrated calcium cyanamide and 570 parts of water are stirred together for approximately 50 minutes at room temperature. A paste is made by adding 50 parts of water to 100 parts of yellow lead oxide, lead carbonate or basic carbonate with agitation until smooth and all the small lumps are broken up. 7.5 parts of this lead paste now thinned with a small quantity of water are added to the cyanamide slurry with agitation to remove sulfur compounds present in the latter. The solution is now filtered and the cake washed with water, the washings being added to the main solution.

Soda ash is now added to the clear solution of calcium acid cyanamide to precipitate the calcium therefrom, approximately 127 parts of a 21% solution being required. An excess of sodium carbonate should be avoided at this point because otherwise basic lead carbonate forms when the lead cyanamide is precipitated in a later step. The precipitated calcium carbonate is then filtered and the cake washed.

The remainder of the lead paste, thinned with a small amount of water, is then added to the cyanamide solution with good agitation. The lead cyanamide thus formed is permitted to settle, the mother liquor decanted and the product thoroughly washed. The lead cyanamide may then be dried at from 70 to 75° C.

Example II

A solution of calcium acid cyanamide is prepared according to the method of Example I. To this solution add a sufficient quantity of the lead paste, to precipitate requisite quantities of the lead content as cyanamide. The magma is then filtered and the cake washed alternately with 2% hydrochloric acid and water until the washings show substantial freedom from calcium. The cake should then be washed with water until free of chlorides and dried as in Example I.

Example III

Where color or covering power is of no moment, the calcium extraction step may be omitted as under these circumstances, the presence of the calcium compounds is not particularly detrimental.

Example IV

Prepare a filtered solution of calcium acid cyanamide as in Example I and add thereto approximately 170 parts of a 20% solution of sulfuric acid to neutralize the solution and precipitate the calcium as sulfate. The latter may be removed by filtration and the cake washed. To the clear solution, 67 parts of 40% alkali metal hydroxide solution such as sodium hydroxide is added to convert the cyanamide to acid sodium cyanamide. To this solution, the lead paste may be added and the procedure set out in Example I for the recovery of lead cyanamide followed.

It has been determined that during the precipitation of lead cyanamide, it is desirable that a condition of strong alkalinity be maintained if a good colored product is to be obtained. The procedures recommended above insure this desirable result. It has also been determined that it is important to maintain an excess of cyanamide solution during the lead paste addition, that is, a quantity of lead not exceeding that sufficient to combine with 70% of the cyanamide content of the solution should be added. Under these conditions, a 95% product can be obtained. On the contrary, where the excess of cyanamide dropped to as low as 11%, the purity of the lead cyanamide product likewise decreased.

Even in the better grades of lead cyanamide produced according to these methods, it may contain as much as 5% of unreacted lead compound. However, inasmuch as such oxide is of a yellow shade, and the carbonate is white, it is not particularly detrimental to the normal uses to which a lead cyanamide pigment may be put. This is especially true where a good grade of yellow lead oxide is used as the starting material. Where, for instance, a crude grade of litharge constitutes one of the reactants, its content of red lead oxide remains unreacted and has a tendency to contaminate the color in the final product.

Samples of a good grade of lead cyanamide prepared as above, when rubbed up in linseed oil to form a paint film, gave good color, gloss and covering power. A product contaminated with calcium carbonate or other calcium compounds did not have as good covering power and the color was somewhat lighter. However, even these products have a distinct field of usefulness.

While the invention has been shown and described with specific reference to particular embodiments, it is to be understood that it is not to be limited thereto but is to be construed broadly and restricted only by the scope of the claims.

We claim:

1. A method of producing lead cyanamide which includes the steps of slurrying calcium cyanamide in water to form a solution of calcium acid cyanamide, adding a compound chosen from the group consisting of yellow lead oxide, lead carbonate and basic lead carbonate thereto, treating the magma resulting therefrom and containing lead cyanamide and calcium compounds with an acid to convert the latter to soluble salts, leaching the same therefrom and recovering the lead cyanamide.

2. The method of claim 1 in which the magma is maintained alkaline in reaction during the acid additions.

KENNETH D. ASHLEY.
CYRIL B. CLARK.